UNITED STATES PATENT OFFICE.

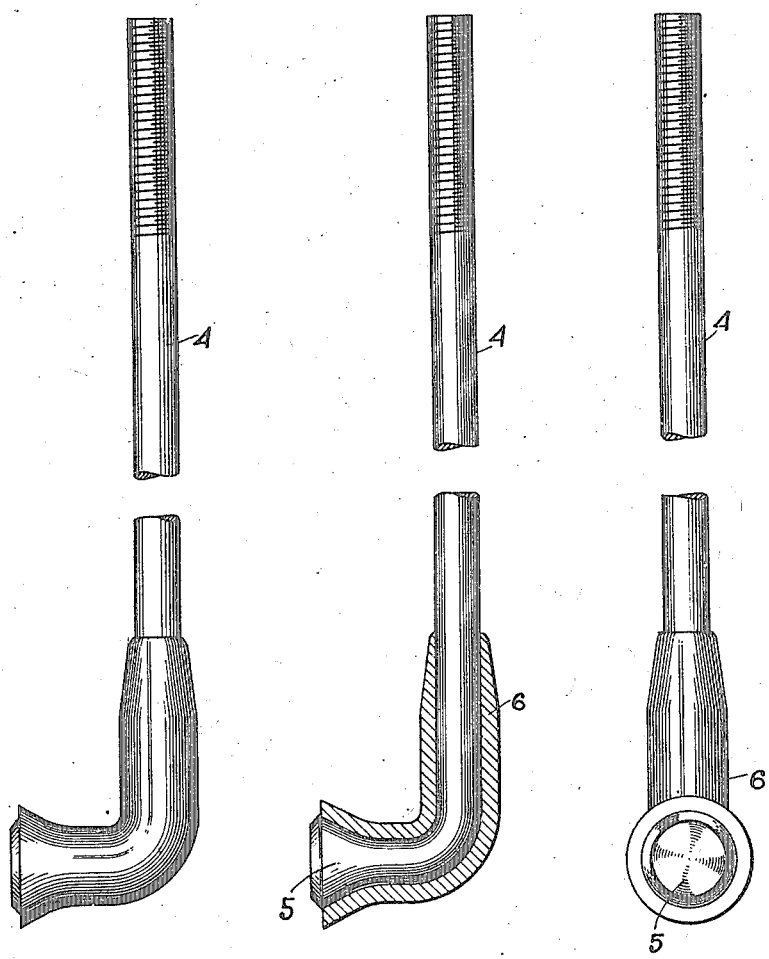

CHARLES FREDRICK MENGE, OF UTICA, NEW YORK, ASSIGNOR TO MOTT WHEEL WORKS, OF UTICA, NEW YORK.

SPOKE.

1,208,609.

Specification of Letters Patent.

Patented Dec. 12, 1916.

Application filed November 7, 1914. Serial No. 870,864.

*To all whom it may concern:*

Be it known that I, CHARLES FREDRICK MENGE, a citizen of the United States, and a resident of Utica, in the county of Oneida and State of New York, have invented a new and Improved Spoke, of which the following is a full, clear, and exact description.

My invention relates to wire spokes for vehicle wheels.

The object thereof is to provide a simple, strong and inexpensive spoke which will have a higher resistance to fatigue than the ordinary wire spoke. I attain the above object by providing a layer of material softer than the material of the spoke at the head of the spoke.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a side elevation of my invention; Fig. 2 is a section through the soft layer of material provided on the spoke; and Fig. 3 is an end view of the same.

Before proceeding to a more detailed description of my invention it must be clearly understood that the layer of material can be provided on straight spokes as well as on spokes bent at the head, according to the various hubs the spokes may be applied to; that it may be used on uniform spokes as shown or on so-called swaged spokes; and that any material softer than the material of which the spoke is made can be used as a layer about the head.

Referring to the drawings, 4 represents a wire spoke, preferably of uniform diameter, the original length of the wire being sufficient to make two spokes, the ends of which are headed cold on an upsetting machine so as to form heads 5. The wire is then cut in the middle, thus forming two spokes. Each of the spokes so formed is then fitted with a sleeve 6 of material softer than the material of which the spoke is formed, and preferably brass is used. The bore of the sleeve is such that the same will fit tightly on the wire spoke. The said sleeve 6 can be made from bar stock on a screw machine; or it may be formed from tubing; or it may be pressed from sheet metal. One end of the sleeve is countersunk or shaped so as to fit the head 5 of the spoke 4. The sleeve is fitted on to the spoke in any suitable way by forcing it thereon, the head of the spoke fitting tightly into the recess provided for the head in the sleeve, as stated. The other end of the spoke can then be provided with thread by any suitable means.

In certain types of hubs the spoke may be used without bending the head, but for most of the types of hubs the spoke is bent at the head at a proper angle by suitable dies, which will prevent the deformation of the sleeve.

The provision of the sleeve 6 prevents change either in form, arrangement or composition of the crystals of the metal of that part of the spoke which is under strain or fatigue and, consequently, prevents the breaking of the spoke. Furthermore, the sleeve increases the resistance of the spoke at the point where it is subjected to the highest strain, as it reinforces the spoke at its bearing in the hub.

From the foregoing description, taken in connection with the accompanying drawings, the advantage of the construction of the spoke and the method of making the same will be readily understood by those skilled in the art to which the invention pertains; and while the spoke, and the method described and illustrated, I consider to be the best embodiment thereof, I desire to have it understood that it is merely illustrative and that such changes may be made when desired as are within the scope of the appended claims.

Having thus described my invention, I claim as new and desire to secure by Letters Patent:

1. A wire spoke having a head at one end and a sleeve of softer metal than the metal of the spoke on the spoke at the head, said sleeve being rigid with the spoke and having an enlarged end adapted to rigidly engage the head.

2. A metal spoke having a head at one end and a sleeve of softer metal on the spoke rigid therewith, said sleeve having a seat for the head of the spoke substantially as and for the purpose set forth.

3. As an article of manufacture, a wire spoke having a head at one end and being threaded at the other end, and a sleeve of softer material fitted tightly on said spoke against the head to make it rigid therewith so that the wire spoke with the sleeve thereon can be shaped simultaneously, substantially as and for the purpose set forth.

In testimony whereof I have signed my name to this specification in the presence of two subscribing witnesses.

CHARLES FREDRICK MENGE.

Witnesses:
 ALBERT JUDGE TIMMERMAN,
 EMMETT J. SODER.